US007299209B2

(12) United States Patent
Collier

(10) Patent No.: US 7,299,209 B2
(45) Date of Patent: Nov. 20, 2007

(54) METHOD, APPARATUS AND SYSTEM FOR SECURELY PROVIDING MATERIAL TO A LICENSEE OF THE MATERIAL

(75) Inventor: David C Collier, Gilroy, CA (US)

(73) Assignee: Macrovision Corporation, Santa Clara, CA (US)

( * ) Notice: Subject to any disclaimer, the term of this patent is extended or adjusted under 35 U.S.C. 154(b) by 1100 days.

(21) Appl. No.: 10/081,173

(22) Filed: Feb. 22, 2002

(65) Prior Publication Data
US 2003/0078795 A1    Apr. 24, 2003

Related U.S. Application Data

(60) Provisional application No. 60/346,802, filed on Oct. 18, 2001.

(51) Int. Cl.
*G06Q 99/00* (2006.01)
(52) U.S. Cl. .............................. 705/59; 705/57; 705/58; 705/51; 726/30; 380/201; 380/202; 380/203
(58) Field of Classification Search ............ 705/51–59; 726/30; 380/201–203
See application file for complete search history.

(56) References Cited

U.S. PATENT DOCUMENTS

| 4,531,020 | A | | 7/1985 | Wechselberger |
| 5,715,403 | A | | 2/1998 | Stefik |
| 6,178,242 | B1 | | 1/2001 | Tsuria |
| 6,202,056 | B1 | | 3/2001 | Nuttall |
| 6,792,280 | B1 | * | 9/2004 | Hori et al. .................. 455/517 |
| 6,865,555 | B2 | * | 3/2005 | Novak .......................... 705/59 |
| 6,898,708 | B2 | * | 5/2005 | Hori et al. ................... 713/171 |
| 6,901,385 | B2 | * | 5/2005 | Okamoto et al. ............. 705/51 |
| 7,113,926 | B1 | * | 9/2006 | Suzuki ......................... 705/52 |
| 2001/0053222 | A1 | * | 12/2001 | Wakao et al. ................. 380/43 |
| 2003/0023564 | A1 | * | 1/2003 | Padhye et al. ................ 705/54 |
| 2003/0046238 | A1 | * | 3/2003 | Nonaka et al. ............... 705/51 |
| 2004/0030656 | A1 | * | 2/2004 | Kambayashi et al. ......... 705/59 |
| 2005/0021467 | A1 | * | 1/2005 | Franzdonk .................... 705/51 |
| 2005/0273862 | A1 | * | 12/2005 | Benaloh et al. ............... 726/26 |

FOREIGN PATENT DOCUMENTS

EP    0 969 668 A2    1/2000

(Continued)

OTHER PUBLICATIONS

Garnett, Nic "Digital Rights Management, Copyright, and Napster", 2001, ACM Press, vol. 2, Issue 2, pp. 1-5.*

(Continued)

*Primary Examiner*—Jalatee Worjloh
(74) *Attorney, Agent, or Firm*—Victor H. Okumoto

(57) ABSTRACT

A method, apparatus and system for securely providing material to a licensee of the material are described. In each, at least one license key is provided, preferably along with a license including usage rights for requested content or material to the licensee. The material requested and licensed by the licensee is provided to the licensee encrypted with at least one content key. To achieve a second-level of security, the at least one content key is provided to the licensee encrypted with the at least one license key so that both the at least one content key and the at least one license key are necessary for the licensee to decrypt and use the encrypted material.

31 Claims, 3 Drawing Sheets

FOREIGN PATENT DOCUMENTS

| | | |
|---|---|---|
| EP | 1 120 967 A2 | 8/2001 |
| EP | 1 130 492 A2 | 9/2001 |
| JP | 2000-083022 | 3/2000 |
| JP | 2000-083233 | 3/2000 |
| JP | 2001-175606 | 6/2001 |

OTHER PUBLICATIONS

Schneier, B., "Applied Cryptography, Second Edition", Applied Cryptography. Protocols, Algorithms, And Source Code In C, New York, John Wiley & Sons, U.S., 1996, pp. 31-42.

Schneier, B., "Applied Cryptography, Second Edition", Applied Cryptography. Protocols, Algorithms, And Source Code In C, New York, John Wiley & Sons, U.S., 1996, pp. 176-177.

Schneier, B., "Applied Cryptography, Lifetime Of Keys", Applied Cryptography. Protocols, Algorithms, And Source Code In C, New York, John Wiley & Sons, U.S., 1996, pp. 183-184.

ISP/IEC JTC1/SC29/WG11 N3943 : "Intellectual Property Management and Protection in MPEG Standards", Jan. 2001, Retrieved from the Internet : <URL :http://www.cselt.it/mpeg/standards/ipmp/> retrieved on Sep. 24, 2001, 10 pages.

PCT Search Report for PCT/US 02/33072 mailed Jun. 4, 2003, 3 pages.

* cited by examiner

METHOD, APPARATUS AND SYSTEM FOR SECURELY PROVIDING MATERIAL TO A LICENSEE OF THE MATERIAL

CROSS REFERENCE TO RELATED APPLICATION

This application is related to co-pending Provisional Patent Application Ser. No. 60/346,802 filed Oct. 18, 2001 which is incorporated herein by reference in its entirety.

FIELD OF THE INVENTION

The present invention generally relates to techniques for preventing unauthorized use of material and in particular, to a method, apparatus and system for securely providing material to a licensee of the material.

BACKGROUND OF THE INVENTION

Providers of material demand compensation for the use of their material or content. Unauthorized use cheats these providers of their due compensation. Therefore, techniques for preventing such unauthorized use have been and continue to be developed. As soon as new techniques are developed and practiced, however, dishonest users seek to circumvent those techniques to avoid paying compensation to the content providers. Consequently, techniques for preventing unauthorized use of material evolve to stay one step ahead.

OBJECTS AND SUMMARY OF THE INVENTION

Accordingly, it is an object of the present invention to provide a method for securely providing material to a licensee of the material.

Another object is to provide an apparatus for securely providing material to a licensee of the material.

Still another object is to provide a system for securely providing material to a licensee of the material.

These and additional objects are accomplished by the various aspects of the present invention that uses at least a two-key approach for added security. Briefly stated, one aspect is a method for securely providing material to a licensee of the material that includes providing at least one license key to a licensee of material; providing the material encrypted with at least one content key to the licensee; and providing the at least one content key encrypted with the at least one license key to the licensee.

Another aspect is an apparatus for securely providing material to a licensee of the material. The apparatus includes at least one server that is configured to transmit at least one license key to a client device operable by a licensee of material; transmit the material encrypted with at least one content key to the client device; and transmit the at least one content key encrypted with the at least one license key to the client device.

Another aspect is a system for securely providing material to a licensee of the material. The system includes a client device operable by a licensee of material; and at least one server configured to transmit at least one license key, the material encrypted with at least one content key, and the at least one content key encrypted with the at least one license key to the client device.

Still another aspect is a method for securely providing material to a licensee of the material that includes providing a license to use material and a license key corresponding to the license; providing the material encrypted with a content key; and providing the content key encrypted with the license key.

Yet another aspect is a method for securely providing material to a licensee of the material that includes receiving a license to use material and a license key corresponding to the license; receiving the material encrypted with a content key; receiving the content key encrypted with the license key; decrypting the encrypted content key using the license key; and decrypting the encrypted material using the decrypted content key.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENT

As used herein: the terms "audio-visual content" or "A/V content" includes audio, visual and other multimedia content including motion pictures, music, the spoken word, photos, and printed text; "material" and "content" may be used interchangeably, and includes A/V and other distributed content such as computer programs or software; and "proprietary material" means material protected by contract or intellectual property law.

Figure 1:
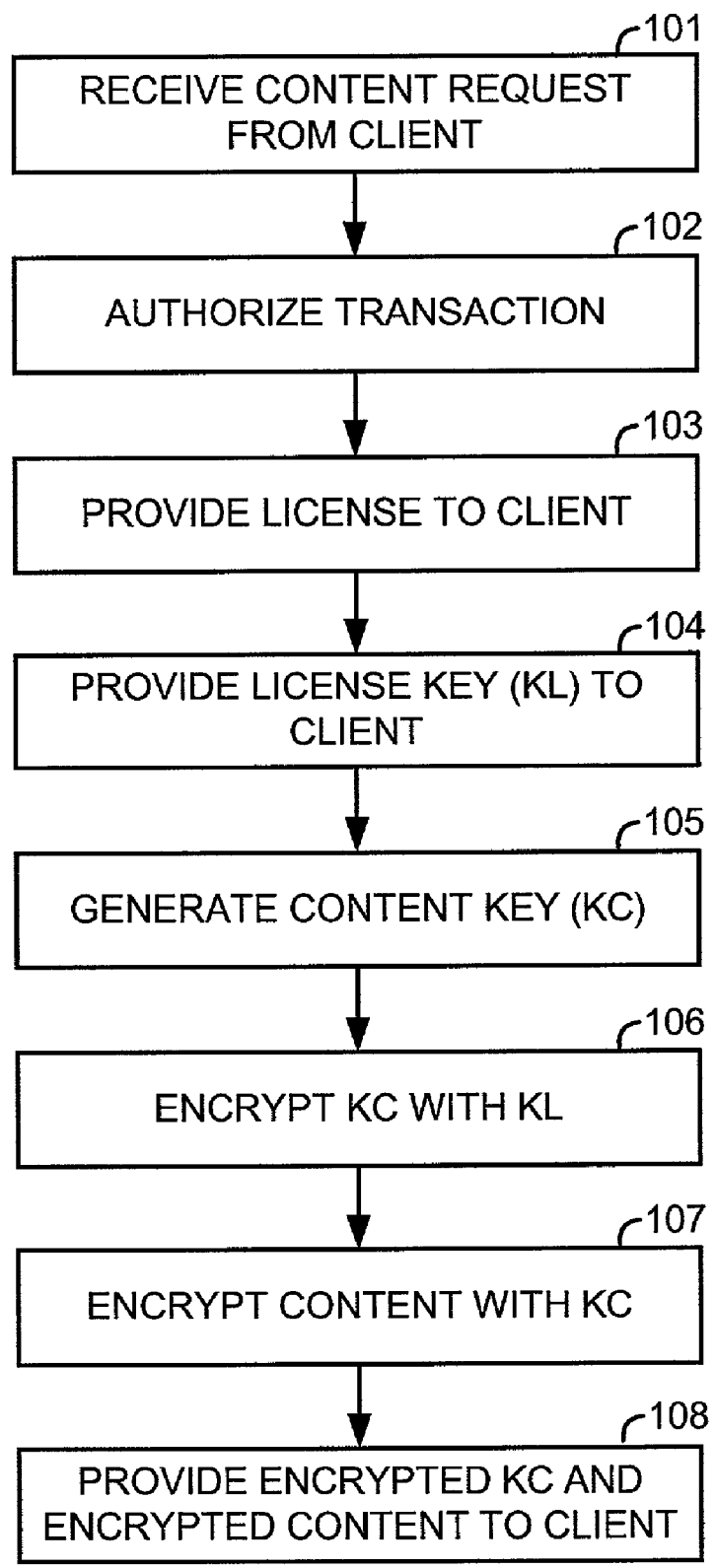
FIG. 1 illustrates a flow diagram of a method implemented, for example, by one or more servers for securely providing material to a licensee of the material, utilizing aspects of the present invention.

FIG. 1 illustrates, as an example, a flow diagram of a method for securely providing material to a licensee of the material that may be performed by one or more servers. In 101, a content or material request is received from a client. The client in this case may be a person, or a client device such as a computer, a set-top box, network appliance, wireless communicating device such as a personal digital assistant ("PDA") or other type of electronic device. Along with the content request that identifies the content being requested such as, for example, a movie or music title, information identifying a client device or its operator may also be provided. In the case of the client device, this may take the form of a host or network interface card identification number, and in the case of the operator, this may take the form of a credit card number or user identification and password. For establishing secure communications between electronic devices, a public key "KU" may also be provided along with the content request. In such case, a conventional authentication and key exchange procedure may be performed to establish a secure channel.

In 102, the transaction is authorized in a conventional manner. Preferably this takes the common form of verifying that the requester or operator of the client has properly paid for the requested content and is not otherwise prohibited from receiving it. Payment may be by credit card with conventional bank confirmation. In addition, the requester may also be first required to accept terms of a license agreement in a click-the-button or other conventional manner before the transaction is authorized.

In 103, a license detailing the usage rights purchased by the requester is provided to the client. The usage rights may include many conventional items such as the number of allowed viewings or playing of material such as a movie, music recording, electronic book, entertainment event or software program. They may also include such things as the time period over which such viewings or playing is allowed. U.S. Pat. No. 5,715,403 entitled "System for Controlling the Distribution and Use of Digital Works having Attached Usage Rights where the Usage Rights are defined by a Usage Rights Grammar", which is incorporated in its entirety herein by this reference, gives numerous examples of such usage rights.

In 104, at least one license key "KL" corresponding to the license is provided preferably at the same time as the license to the client. As will be discussed in more detail below, a primary purpose of the at least one license key "KL" is to provide a second level of security by encrypting an at least one content key "KC" that is in turn, used to encrypt the requested content prior to its transmission to the client. In one embodiment of the invention, the at least one license key comprises a plurality of license keys that are used one-at-a-time in a predetermined fashion for encrypting the at least one content key.

In 105, the at least one content key "KC" is conventionally generated. In 106, the at least one content key is encrypted by the at least one license key in a conventional manner. Where the at least one license key comprises a plurality of license keys for encrypting and decrypting the at least one content key, the plurality of license keys are preferably used one-at-a-time in a predetermined fashion for such encryption and corresponding decryption. For example, they may be used on a periodically rotating time basis for encrypting and decrypting the at least one content key. Thus, with the many possible combinations of license and content keys, increased security is provided using the method.

In 107, the requested material is encrypted with the at least one content key "KC" in a conventional manner. Where the at least one content key comprises a plurality of content keys for encrypting and decrypting the requested material, the plurality of content keys are preferably used one-at-a-time in a predetermined fashion for such encryption and corresponding decryption, depending upon the application. In 108, the content key encrypted with the license key (also referred to herein simply as the "encrypted content key") and the material encrypted with the at least one content key (also referred to herein simply as the "encrypted material" or "encrypted content") are provided to the client, either in separate transactions or in the same transaction. The order of the separate transactions is generally not important. The encrypted material may be provided as a file or streaming media.

In one application example where the requested content or material is included in at least one MPEG-4 bit stream such as its video and audio bit streams, the at least one content key conventionally comprises a plurality of content keys that are used one-at-a-time in a predetermined fashion for encrypting corresponding time periods of the material. Alternatively, they may be used one-at-a-time in a predetermined fashion for encrypting corresponding portions of the material. The at least one content key in this case is encrypted with the at least one license key, and included in an IPMP ("Intellectual Property Management & Protection") stream that is provided to the licensee along with the material included in the MPEG-4 bit stream that is encrypted with the at least one content key. The at least one content key in this case is conventionally mapped to corresponding portions of the material included in the at least one MPEG-4 bit stream that is encrypted with the at least one content key, by IPMP descriptors associated with the corresponding portions.

Figure 2:
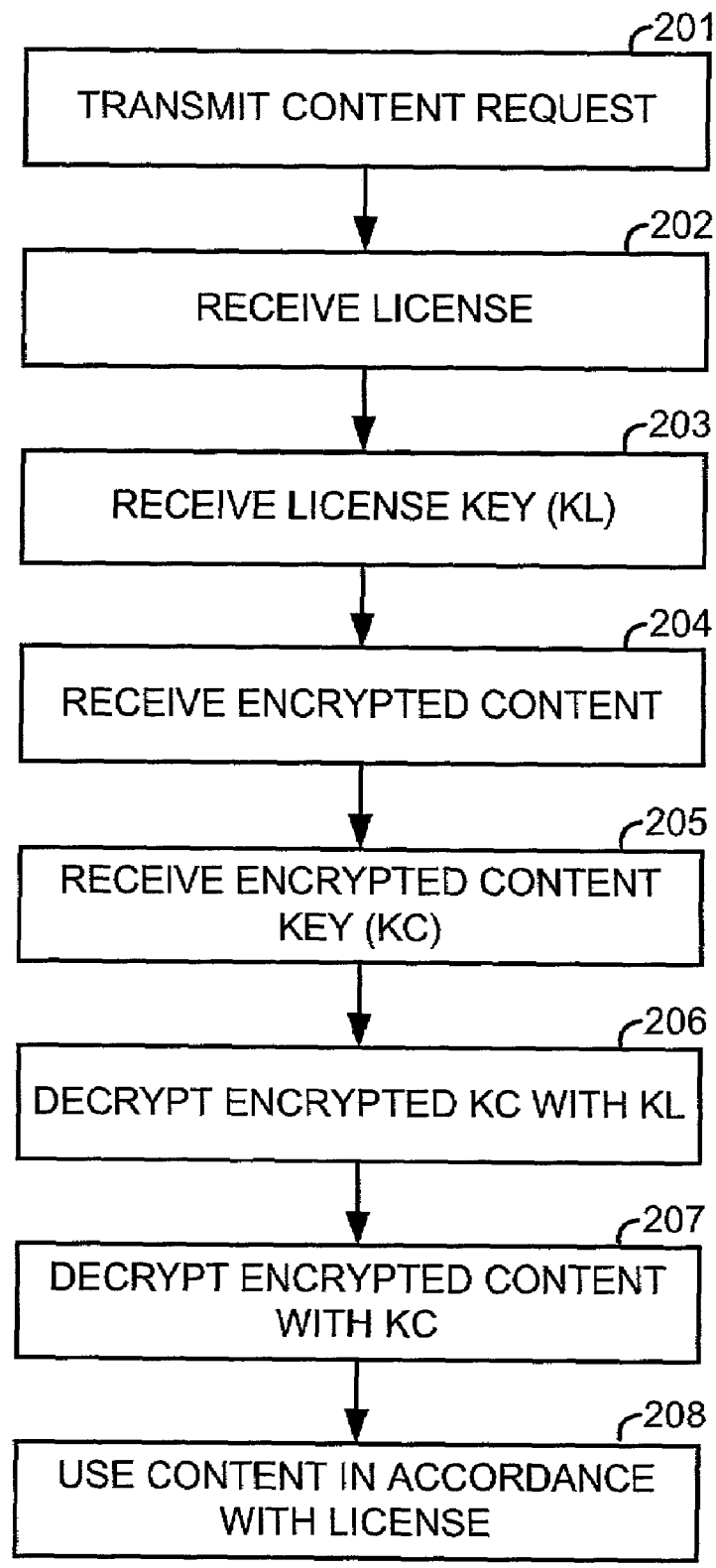
FIG. 2 illustrates a flow diagram of a method implemented, for example, by a client for securely providing material to a licensee of the material, utilizing aspects of the present invention.

FIG. 2 illustrates, as an example, a flow diagram of a method for securely providing material to a licensee of the material that may be performed by a client and is complementary to the method described in reference to FIG. 1. In 201, a content or material request is made by a client. The client in this case may be a person, or a client device such as a computer, a set-top box, network appliance, wireless communicating device such as a PDA or other type of electronic device. Along with the content request that identifies the content being requested such as, for example, a movie or music title, information identifying a client device or its operator may also be provided. In the case of the client device, this may take the form of a host or network interface card identification number, and in the case of the operator, this may take the form of a credit card number or user identification and password. For establishing secure communications between electronic devices, a public key "KU" may also be provided along with the content request. In such case, a conventional authentication and key exchange procedure may be performed to establish a secure channel, thus providing a third level of security through three key levels (i.e., KU, KL and KC).

In 202, a license detailing the usage rights purchased by the requester is received. In 203, at least one license key "KL" corresponding to the license is also received, either along with the license or in a separate transaction. In 204, the requested material is received encrypted with at least one content key. In 205, the at least one content key "KC" is received encrypted with the at least one license key, either along with the encrypted material or in a separate transaction. When the encrypted material and the encrypted at least one content key are received in separate transactions, the order that they are received is generally not important. When the encrypted at least one content key is provided with the encrypted material, such as in the case of the MPEG-4 example described above, the encrypted at least one content is extracted from the combination.

In 206, the encrypted at least one content key is decrypted using the at least one license key in a conventional manner. Where the at least one content key comprises a plurality of content keys, and/or the at least one license key comprises a plurality of license keys, such decryption follows a complementary process to the encryption described in reference to 106 of FIG. 1. In 207, the encrypted content or material is then decrypted using the at least one content key in a conventional manner. Where the at least one content key comprises a plurality of content keys, such decryption follows a complementary process to the encryption described in reference to 107 in FIG. 1. In 208, the content is then used in accordance with the license, using conventional control software installed on the client device.

Figure 3:
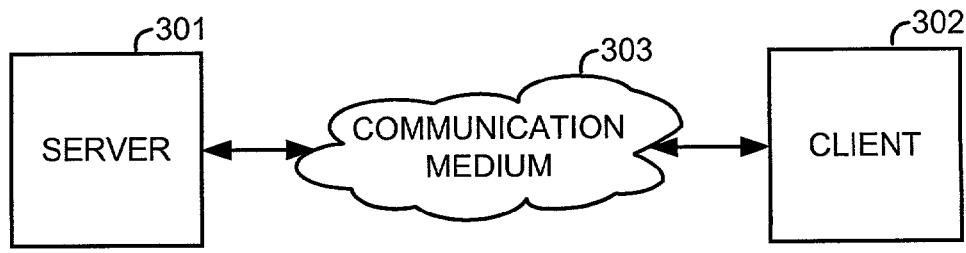
FIGS. 3-5 illustrate, as examples, block diagrams of three systems for securely providing material to a licensee of the material, utilizing aspects of the present invention.
Figure 4:
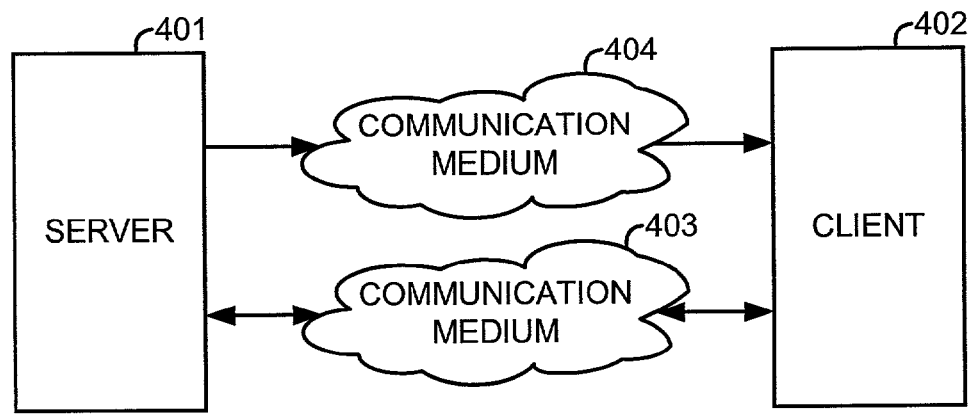
Figure 5:
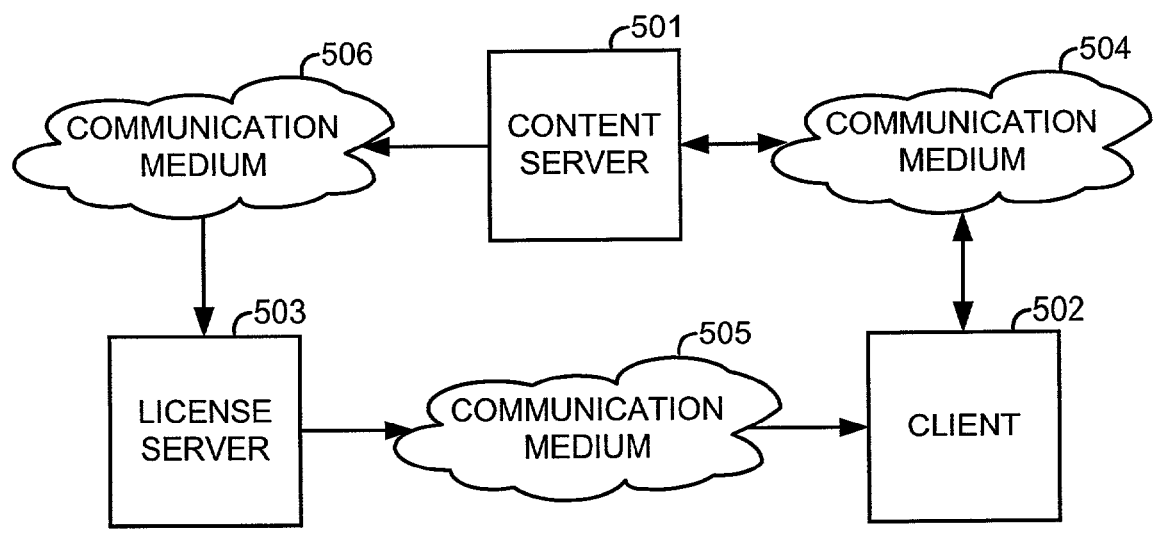

FIGS. 3~5 illustrate, as examples, block diagrams of representative systems for securely providing material to a licensee of the material. In FIG. 3, a server 301 performs the method described in reference to FIG. 1, and a client 302 performs the method described in reference to FIG. 2. In this case, all transmissions between the server 301 and the client 302 go through a communication medium 303, which may be, for examples, the Internet or a direct connection through cable, satellite or telephone modem.

In FIG. 4, a server 401 likewise performs the method described in reference to FIG. 1, and a client 402 likewise performs the method described in reference to FIG. 2. In this case, however, certain portions of the methods described in reference to FIGS. 1 and 2, such as, for example, the content request and transmission of the encrypted content and encrypted at least one content key, go through a communication medium 403, and other portions of the methods described in reference to FIGS. 1 and 2, such as, for example, the transmission of the license and the license key, go through another communication medium 404 for additional security.

In FIG. 5, servers 501 and 503 combine to perform the method described in reference to FIG. 1, whereas client 502 performs the method described in reference to FIG. 2. In this system, the server 501 is referred to as a content server, because it preferably performs portions of the method described in reference to 101, 102 and 105~108 in FIG. 1. The server 503, on the other hand, is referred to as a license server, because it preferably performs the remaining portions of the method described in reference to 103 and 104 in FIG. 1. Communications between the content server 501, client 502 and license server 503 may go through communication mediums 504, 505 and 506, as shown. Other arrangements of multi-server systems are also fully contemplated to be within the full scope of the present invention. U.S. Pat. No. 6,202,056 B1, entitled "Method for Computer Network Operation Providing Basis for Usage Fees", which is incorporated herein by this reference, is just one example of a multi-server system in which the present invention may be employed.

Although the various aspects of the invention have been described with respect to preferred embodiments, it will be understood that the invention is entitled to full protection within the full scope of the appended claims.

I claim:

1. A method for securely providing material to a licensee of the material, comprising:
    providing a plurality of license keys to a licensee of material;
    providing said material in at least one MPEG-4 bit stream encrypted by a plurality of content keys for corresponding time periods of said material; and
    providing said plurality of content keys encrypted with said plurality of license keys, used one-at-a-time on a periodically rotating basis for encrypting and decrypting said plurality of content keys, to said licensee in an Intellectual Property Management and Protection (IPMP) stream provided along with said material.

2. The method according to claim 1, further comprising providing a license authorizing said licensee to use said material.

3. The method according to claim 2, wherein said license includes a plurality of usage rights for using said material.

4. The method according to claim 2, wherein said plurality of license keys are provided along with said license to said licensee.

5. The method according to claim 1, wherein said providing said plurality of license keys to a licensee of material, comprises providing said plurality of license keys encrypted with a public key of said licensee to said licensee.

6. The method according to claim 1 wherein said plurality of content keys encrypted with said plurality of license keys and said material encrypted with said plurality of content keys are provided by transmitting them over an authenticated secure channel to said licensee.

7. The method according to claim 1, wherein said providing said material encrypted with said plurality of content keys to said licensee, comprises encrypting said material in real-time with said plurality of content keys and providing said material encrypted with said plurality of content keys to said licensee by transmitting it as streaming media.

8. The method according to claim 1, wherein said plurality of content keys encrypted with said plurality of license keys is mapped to corresponding portions of said material included in said at least one MPEG-4 bit stream encrypted with said plurality of content keys, by IPMP descriptors associated with said corresponding portions.

9. The method according to claim 1, wherein said plurality of content keys are used one-at-a-time for encrypting and decrypting said corresponding time periods of said material.

10. An apparatus for securely providing material to a licensee of the material, comprising at least one server configured with at least one computer program for:
    transmitting a plurality of license keys to a client device operable by a licensee of material;
    transmitting said material in at least one MPEG-4 bit stream encrypted by a plurality of content keys for corresponding periods of time of said material; and
    transmitting said plurality of content keys encrypted with said plurality of license keys, used one-at-a-time on a periodically rotating basis for encrypting and decrypting said plurality of content keys, to said client device in an Intellectual Property Management and Protection (IPMP) stream provided along with said material.

11. The apparatus according to claim 10, wherein said at least computer program is further for transmitting a license authorizing said licensee to use said material.

12. The apparatus according to claim 11, wherein said license includes a plurality of usage rights for using said material.

13. The apparatus according to claim 10, wherein said at least one computer program is further for establishing an authenticated secure channel with said client device and transmit said plurality of license keys along with said license to said client device over said secure channel.

14. The apparatus according to claim 10, wherein said at least one server comprises a license server configured with a licensing computer program for transmitting said plurality of license keys to said client device, and a data providing server configured with a data providing computer program for transmitting said material encrypted with said plurality of content keys and said plurality of content keys encrypted with said plurality of license keys, to said client device.

15. The apparatus according to claim 10, wherein said plurality of content keys encrypted with said plurality of license keys is mapped to corresponding portions of said material included in said at least one MPEG-4 bit stream encrypted with said plurality of content keys by IPMP descriptors associated with said corresponding portions.

16. The apparatus according to claim 10, wherein said plurality of content keys are used one-at-a-time for encrypting and decrypting said corresponding time periods of said material.

17. A system for securely providing material to a licensee of the material, comprising:
    a client device operable by a licensee of material; and
    at least one server configured to transmit a plurality of license keys, said material in at least one MPEG-4 bit stream encrypted by a plurality of content keys for corresponding time periods of said material, and said plurality of content keys encrypted with said plurality of license keys, used one-at-a-time on a periodically rotating basis for encrypting and decrypting said plurality of content keys, to said client device in an Intellectual Property Management and Protection (IPMP) stream provided along with said material.

18. The system according to claim 17, wherein said at least one server is further configured to transmit a license authorizing said licensee to use said material to said client.

19. The system according to claim 18, wherein said license includes a plurality of usage rights for using said material.

20. The system according to claim 18, wherein said at least one server is further configured to establish an authenticated secure channel with said client device and transmit said plurality of license keys along with said license to said client device over said secure channel.

21. The system according to claim 17, wherein said at least one server comprises a license server configured to transmit said plurality of license keys to said client device, and a data providing server configured to transmit said encrypted material and said encrypted plurality of content keys to said client device.

22. The system according to claim 17, wherein said plurality of content keys encrypted with said plurality of license keys is mapped to corresponding portions of said material included in said at least one MPEG-4 bit stream encrypted with said plurality of content keys by IPMP descriptors associated with said corresponding portions.

23. The system according to claim 17, wherein said plurality of content keys are used one-at-a-time for encrypting and decrypting said corresponding time periods of said material.

24. The system according to claim 17, wherein said client device is configured to:
    decrypt said encrypted plurality of content keys using said plurality of license keys; and
    decrypt said encrypted material using said decrypted plurality of content keys.

25. The system according to claim 24, wherein said client is further configured to receive said plurality of license keys along with a license authorizing said licensee to use said material from said at least one server.

26. The system according to claim 25, wherein said license includes a plurality of usage rights for using said material.

27. The system according to claim 26, wherein said client is further configured to use said material only in accordance with said plurality of usage rights of said license.

28. A method for securely receiving material from a licensor of the material, comprising:
    receiving a license to use material;
    receiving a plurality of license keys corresponding to said license;
    receiving said material in at least one MPEG-4 bit stream encrypted by a plurality of content keys for corresponding time periods of said material;
    receiving said plurality of content keys encrypted with said plurality of license keys, used one-at-a-time on a periodically rotating basis for encrypting and decrypting said plurality of content keys, in an Intellectual Property Management and Protection (IPMP) stream provided along with said material;
    decrypting said encrypted plurality of content keys using said plurality of license keys; and
    decrypting said encrypted material using said decrypted plurality of content keys for corresponding time periods of said material.

29. The method according to claim 28, wherein said license includes a plurality of usage rights for using said material.

30. The method according to claim 28, wherein said encrypted plurality of content keys is received with said encrypted material.

31. The method according to claim 28, wherein said license, said plurality of license keys, said encrypted material, and said encrypted plurality of content keys are received electronically.

* * * * *